United States Patent [19]

Takahashi et al.

[11] Patent Number: 4,540,184

[45] Date of Patent: Sep. 10, 1985

[54] SAND-FILLED SEALING STRUCTURE BETWEEN AT LEAST ONE TUBE AND A TUBE SUPPORT PLATE

[75] Inventors: Kunio Takahashi; Noriyuki Oda, both of Chiba; Nobuyuki Kido, Fujisawa; Keizi Muramatsu, Ichikawa, all of Japan

[73] Assignee: Asahi Glass Company, Ltd., Tokyo, Japan

[21] Appl. No.: 694,261

[22] Filed: Jan. 24, 1985

[30] Foreign Application Priority Data

Jan. 26, 1984 [JP] Japan .................................. 59-11059
Feb. 16, 1984 [JP] Japan .................................. 59-26028

[51] Int. Cl.³ ............................................. F16J 15/14
[52] U.S. Cl. ..................................... 277/12; 277/105; 277/DIG. 6; 277/1; 165/47; 165/149
[58] Field of Search ...................... 277/1, 12, 32, 205, 277/105, 206 R, 212 R, 212 C, DIG. 6; 165/47, 149, DIG. 10

[56] References Cited

U.S. PATENT DOCUMENTS

| | | | |
|---|---|---|---|
| 3,419,067 | 12/1968 | Taggart | 277/12 X |
| 3,898,163 | 8/1975 | Mott | 277/205 X |
| 4,172,598 | 10/1979 | Thomas | 277/1 |
| 4,196,504 | 4/1980 | Eastman | 165/DIG. 10 X |
| 4,323,252 | 4/1982 | Lagana et al. | 277/12 |

FOREIGN PATENT DOCUMENTS

| | | | |
|---|---|---|---|
| 814855 | 6/1969 | Canada | 277/1 |
| 2711112 | 9/1978 | Fed. Rep. of Germany | 277/DIG. 6 |
| 531112 | 12/1940 | United Kingdom | 165/DIG. 10 |

Primary Examiner—Robert S. Ward
Attorney, Agent, or Firm—Oblon, Fisher Spivak, McClelland & Maier

[57] ABSTRACT

A sealing structure between at least one tube and a tube support plate having a hole for each tube to extend therethrough, characterized in that a ring member enclosing each tube with a space therefrom is secured to the tube support plate, a sand is filled in the space to form a cylindrical sand layer surrounding the tube, a means for preventing leakage of the sand is provided at each axial end of the sand layer.

13 Claims, 12 Drawing Figures

SAND-FILLED SEALING STRUCTURE BETWEEN AT LEAST ONE TUBE AND A TUBE SUPPORT PLATE

The present invention relates to a sealing structure between at least one tube and a tube support plate, e.g. in a tubular heat exchanger.

For the convenience of description, a reference is made to a heat exchanger comprising a gas channel through which a heating gas such as a high temperature combustion gas flows and a plurality of transversely extending heat exchanger tubes through which a gas to be heated, flows. In such a heat exchanger, holes are provided on the channel wall constituting a tube support plate, and the heat exchanger tubes extend through the holes and project with their open ends located outside the channel wall. It has been known to provide a header to enclose the projected portions and the open ends of the tubes. After being assembled, the heat exchanger of this type is heated and used at a high temperature. Thus, there is a considerable temperature difference between at the time of the assembling and at the time of its use. Further, even during the use, there will be a substantial temperature difference and temperature distribution between the heat exchanger tubes in which a gas to be heated flows and the tube support plate along which the heating gas flows and accordingly which is substantially affected by the temperature of the heating gas. Furthermore, both the gas to be heated and the heating gas undergo temperature changes as time passes. Due to such temperature differences, temperature distribution and temperature changes, there will be a difference in the thermal expansion degrees between the heat exchanger tubes and the tube support plate, whereby a thermal stress will be created. Further, in many cases, such a heat exchanger takes a form of a heavy large size structural installation, whereby a mechanical stress will be created by the weight of the installation itself, by the load caused by the manufacturing error or by other external forces.

In order to prevent a deformation or breakage of the parts of the heat exchanger due to such thermal stress or mechanical stress, it is desired to enlarge the holes provided on the tube support plate so that their diameter is larger than the outer diameter of the heat exchanger tubes and thereby provide a structure which permits relative displacement of the heat exchanger tubes and the tube support plate. However, such a structure permits leakage of gases through the clearances between the holes and the heat exchanger tubes, whereby the heating gas and the gas to be heated will be mingled, such being undesirable.

Therefore, the applicants have previously proposed, e.g. in Japanese Utility Model Application No. 36309/1983, a structure wherein a partition plate is provided between the open ends of the heat exchanger tubes and the tube support plate, in parallel with the tube support plate, to divide the header, and a sand is filled in the chamber defined by the tube support plate, the partition plate and the circumferential side wall of the header. Such a structure is useful as such, but had certain difficulties to be solved. Namely, in the case where the temperature of the heating gas is high, the tube support plate located between the high temperature heating gas and the heat insulating sand layer, is likely to be heated to a relatively high temperature, whereby the mechanical strength and corrosion resistance of the tube support plate are likely to deteriorate in the case of a metal tube support plate. Otherwise, it was necessary to employ a tube support plate made of an expensive special metal or a refractory material which is inferior in the air tightness or in the toughness. Further, in such a structure, if only one of a plurality of heat exchanger tubes is damaged or if a sealing means for only one of such tubes becomes defective, it used to be necessary to disassemble and reassemble the entire sealing system for the plurality of the heat exchanger tubes. Accordingly, it is an object of the present invention to solve the above-mentioned difficulties and to provide a sealing structure between the tubes and the tube support plate whereby the gas flowing in the gas channel and the gas flowing in the tubes are air-tightly sealed from each other, a relative displacement of the tube support plate and the tubes is permitted so as to prevent excessive thermal stress or mechancial stress from being exerted to these parts, and the temperature of the tube support plate can be maintained at a relatively low level.

Another object of the present invention is to provide a sealing structure between the tubes and the tube support plate whereby the amount of the sand required can be reduced, and the sand can be readily filled.

Namely, the present invention provides a sealing structure between at least one tube and a tube support plate having a hole for each tube to extend therethrough, characterized in that a ring member enclosing each tube with a space therefrom is secured to the tube support plate, a sand is filled in the space to form a cylindrical sand layer surrounding the tube, and a means for preventing leakage of the sand is provided at each axial end of the sand layer.

According to the present invention, the tubes and the tube support plate are not directly secured to each other, but supported by a sand layer which is deformable and has air-tightness, whereby the gas flowing in the gas channel and the gas flowing in the tubes are air-tightly sealed from each other by the sand layer, and even when there is a relative displacement between the tubes and the tube support plate, such a displacement can be absorbed by the deformation of the sand layer and no excessive stress will be exerted to these parts. Further, the tube support plate will be in contact with the low temperature gas flowing in the tubes, directly i.e. not via the sand layer, whereby the temperature of the tube support plate can be maintained at a relatively low level. Furthermore, the sealing structure of the present invention is independent for every tube. Accordingly, if one of the tubes is damaged or the sealing structure for one of the tubes becomes defective, it is only required to replace the sealing structure for the particular tube, and thus there is a merit in that no other sealing structures will be affected by such a damage or defect.

Now, the present invention will be described in detail with reference to the preferred embodiments.

In the accompanying drawings.

Figure 1:
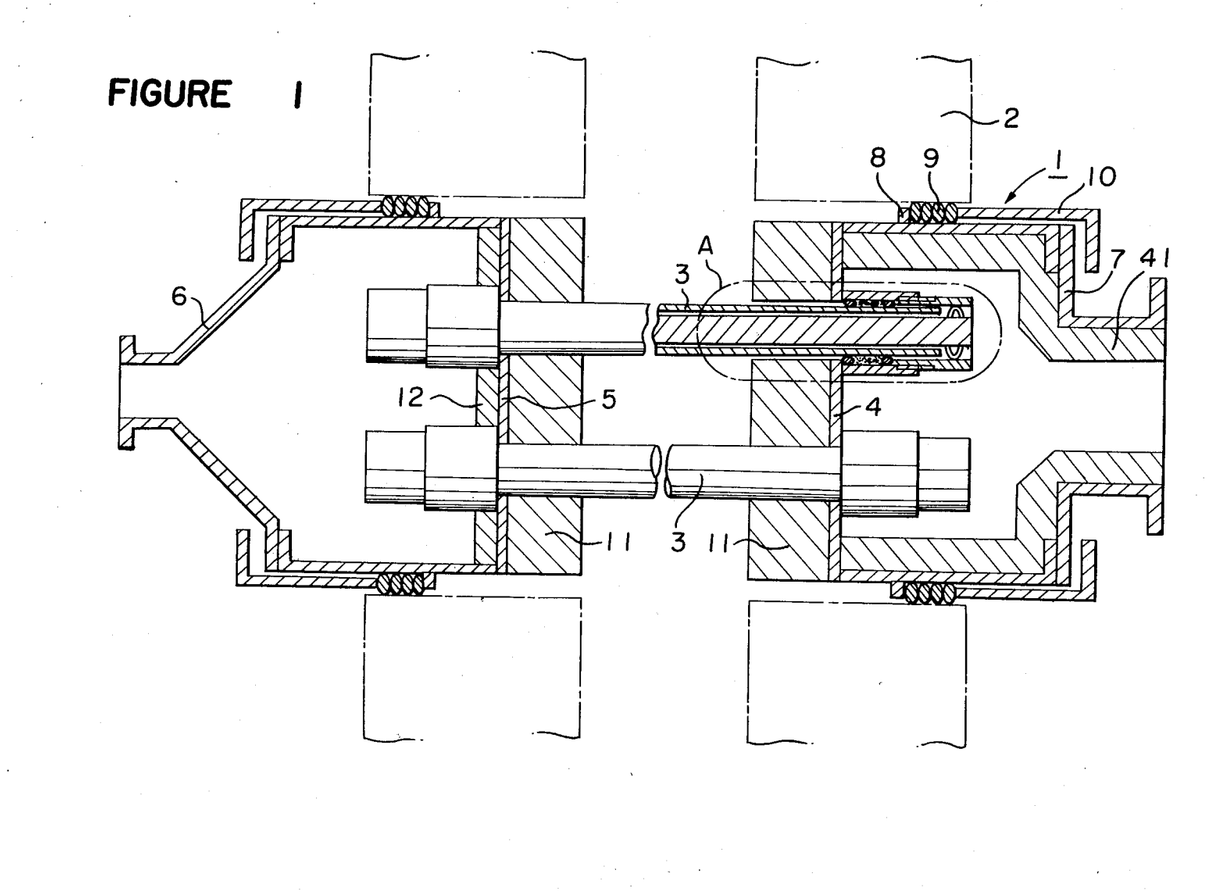
FIG. 1 is a cross sectional view of a heat-exchanger to which the present invention is applied.

Referring to FIG. 1, a heat exchanger 1 is disposed across a gas channel 2 made of e.g. a refractory material. This heat exchanger 1 comprises a plurality of ceramic heat exchanger tubes 3, tube support plates 4 and 5, an inlet side header 6 for a gas to be heated and an outlet side header 7, as main components. In the gas channel 2, a combustion waste gas having a high temperature of e.g. 1,000° C. flows as a heating gas in a vertical direction between the tube support plates 4 and 5, while a gas to be heated, flowing in from the inlet side header 6 and having a temperature of e.g. room temperature, is heated to a tempeature of e.g. 600° C. during its travel through the heat exchanger tubes 3 and flows out of the outlet side header 7. Between the gas channel 2 and the heat exchanger 1, a stopper 8 secured to the heat exchanger 1, a heat resistant sealing member 9, and a pressing means 10 are disposed as illustrated, whereby the heat resistant sealing member 9 is pressed by the pressing means 10 towards the stopper 8 to establish a sealing to prevent leakage of the heating gas.

Figure 4:
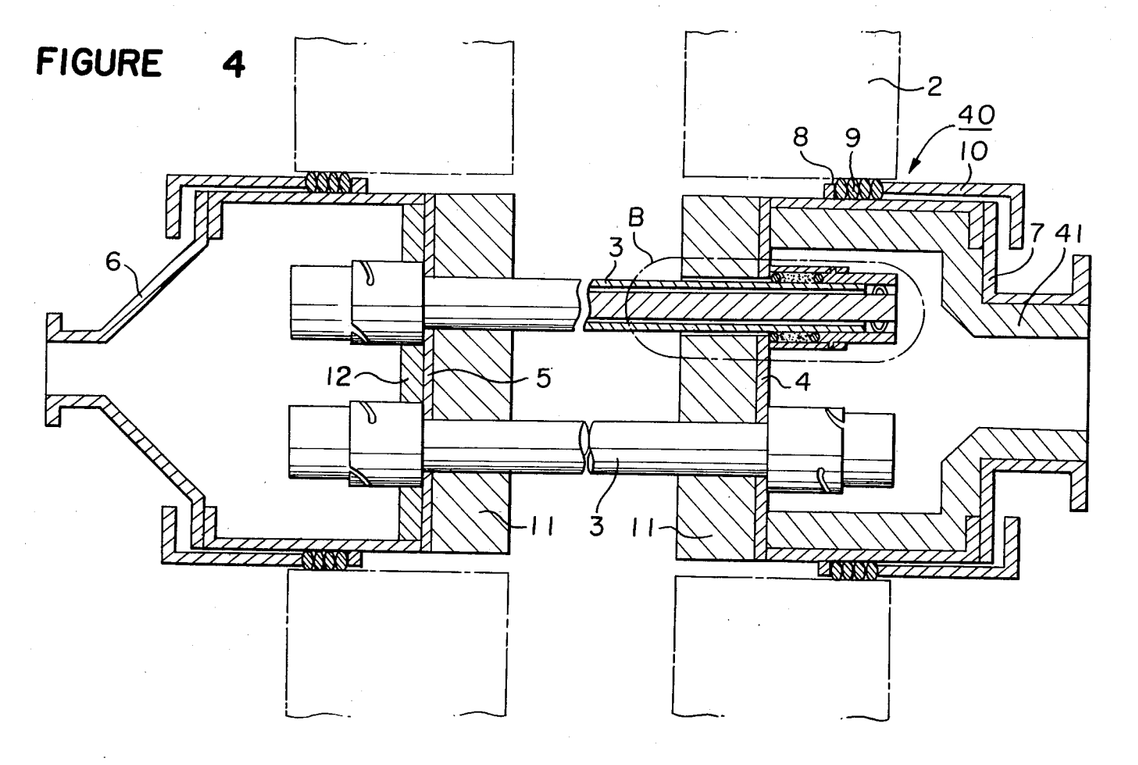
FIG. 4 is a cross sectional view of another heat exchanger to which the present invention is applied.

The heating gas sides of the tube support plates 4 and 5 made of a metal, are lined, respectively, with a refractory materials 11, and the side of the tube support plate 5 facing the inlet for the gas to be heated, is lined with a heat insulating plate 12. On the other hand, the side of the tube support plate 4 facing the outlet for the heated gas is exposed directly to the heated gas. Further, the outlet side header 7 is also lined with a heat insulating material 41. In FIG. 1 and FIG. 4, the structures of the joint portions between the tube support plates 4 and 5 and the heat exchanger tubes 3 are all alike. Therefore, only one joint structure is shown in cross section, the rest being shown by their contours.

Figure 2:
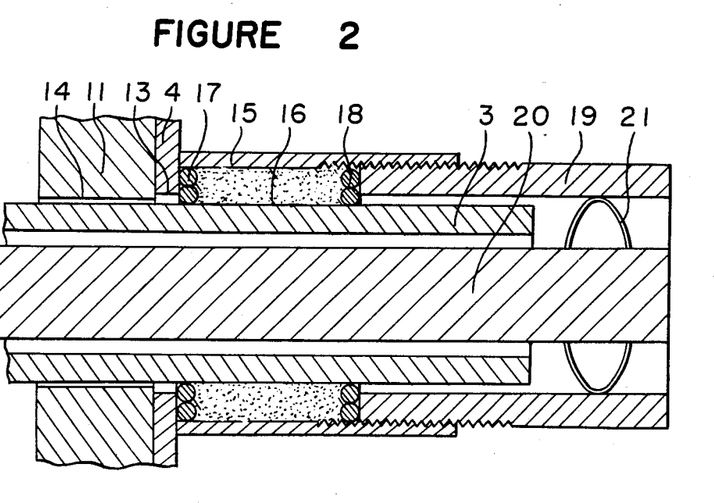
FIG. 2 is an enlarged cross sectional view of portion A of FIG. 1 illustrating an embodiment of the present invention.

As shown in FIG. 2 as an embodiment of the present invention, the tube support plate 4 is provided with a hole 13 having a diameter slightly larger than the outer diameter of the heat exchanger tube 3, and the refractory material 11 is likewise provided with a through-hole 14. The heat exchanger tube 3 extends through the hole 13 and the through-hole 14. An internally threaded ring member 15 is secured to the side of the tube support plate 4 facing the gas to be heated. This ring member 15 encloses the heat exchanger tube 3 with a space of e.g. from 5 to 30 mm therefrom. In the space between the ring member 15 and the heat exchanger tube 3, a heat resistant inorganic sand 16 is filled to form a sand layer having air-tightness. As the sand 16, there may be employed any optional particulate material having a proper particle size depending upon the temperature condition or the anti-corrosive condition under which the sealing structure of the present invention is used. It is usually preferred to employ an inorganic particulate material having a particle size of at most 0.3 mm, more preferably at most 0.05 mm, with a view to securing the air-tightness. For instance, there may be mentioned diatomaceous earth, silica sand, silica powder, cordierite powder, graphite powder or boron nitride powder. At each axial end of the sand layer, a flexible inorganic rope member 17 or 18 such as an asbestos rope or a synthetic inorganic fiber rope is provided as a means for preventing leakage of the sand 16 from the sand layer. Further, the rope member 18 is pressed towards the rope member 17 by a pressing ring 19 having an outer male screw thread corresponding to the inner female screw thread of the ring member 15.

Thus, the sand 16 is densely filled in between the heat exchanger tube 3 and the ring member 15, whereby the heating gas and the gas to be heated are air-tightly sealed from each other. Further, the heat exchanger tube 3 is supported by the sand layer, and accordingly a relative displacement of the heat exchanger tube in the radial direction to some extent may be absorbed by the deformation of the sand layer, and even if a force is exerted to create a relative displacement in the axial direction, such a force can be released by the sliding engagement with the sand layer. One side of the tube support plate 4 is directly exposed to the heated gas of the temperature of e.g. 600° C., whereby the temperature of the tube support plate 4 may not increase so much beyond 600° C., and the tube support plate may be adequately durable. If a sand layer is formed to cover entirely the heated gas side of the tube support plate 4, the temperature of the tube support plate 4 will increase to a level of e.g. about 800° C., whereby the durability will be impaired or the selection of the material will be difficult.

Referring to FIG. 2, in the ceramic heat exchanger tube 3, a stainless steel rod 20 with an oxidation-treated surface is coaxially disposed with a space from the heat exchanger tube 3. This rod 20 is held at a predetermined position by elastic members 21 disposed between the rod 20 and a pressing ring 19 so that a relative displacement of the rod 20 or the pressing ring 19 in the axial and radial directions is permitted. The elastic members 21 are disposed at intervals along the circumferential direction of the rod 20 so that they do not prevent the flow of the gas to be heated. With such an internal double structure of the heat exchanger tube 3, the gas to be heated flows through an annular space between the outer circumference of the rod 20 and the inner circumference of the heat exchanger tube 3, whereby the convective heat transfer coefficient for the heating of the gas to be heated increases substantially, and the heat from the rod 20 heated by the radiation from the heat exchanger tube 3 also contributes substantially to the heating of the gas to be heated. Thus, the heating of the gas to be heated is thereby remarkably promoted.

Figure 3:
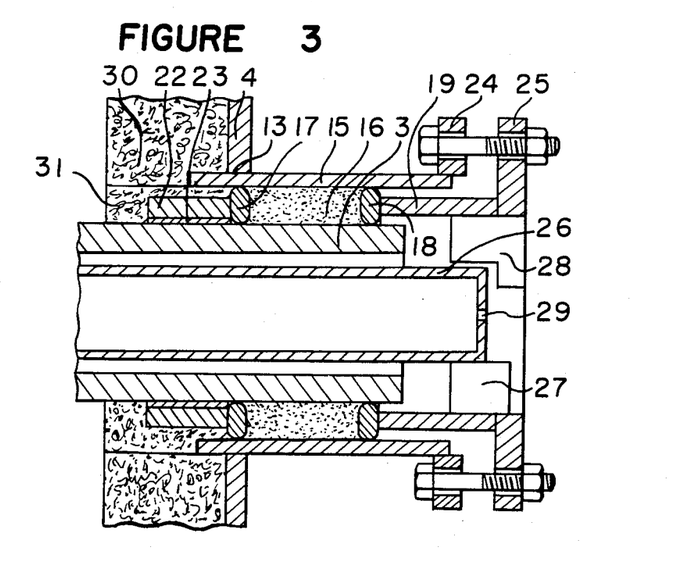
FIG. 3 is an enlarged cross sectional view of a portion corresponding to portion A of FIG. 1, illustrating another embodiment of the present invention.

In FIG. 3 illustrating another embodiment of the present invention, flange fastening is employed instead of the screw fastening in FIG. 2. The same parts as in FIG. 2 are identified by the same reference numerals. On the outer circumference of the ceramic heat exchanger tube 3, a short ceramic ring-shaped stopper 22 is bonded by an inorganic heat resistant adhesive layer 23. A ring member 15 is secured to a tube support plate 4 so that it fits in a hole 13. A flange 24 is secured to the other end of the ring member 15. A flange 25 is secured also to one end of a pressing ring 19. A rope member 18 is pressed towards a rope member 17 by bolting the flanges 24 and 25. Further, in the heat exchanger tube 3, a stainless steel hollow tube 26 with a blackened surface is located instead of the rod 20 in FIG. 2. The hollow tube 26 is placed on stands 27 secured to the pressing ring 19, and the movement of the hollow tube 26 beyond a permitted range is prevented by guide members 28 secured to the pressing ring 19. The end surface of the hollow tube 26 is closed except for a perforation 29. Thus, there is no substantial flow of the gas to be heated, in the hollow tube 26, and the inside of the hollow tube 26 will not be pressurized or vacuumed even when the temperature changes. The stands 27 and the guide members 28 are disposed at intervals along the circumference of the hollow tube 26 in the same manner as in the case of the elastic members 21 in FIG. 2. Further, the heating gas side of the tube support plate 4 is lined with a flexible heat resistant inorganic fibrous blanket 30. A similar blanket 31 is provided around the stopper 22.

Figure 11:
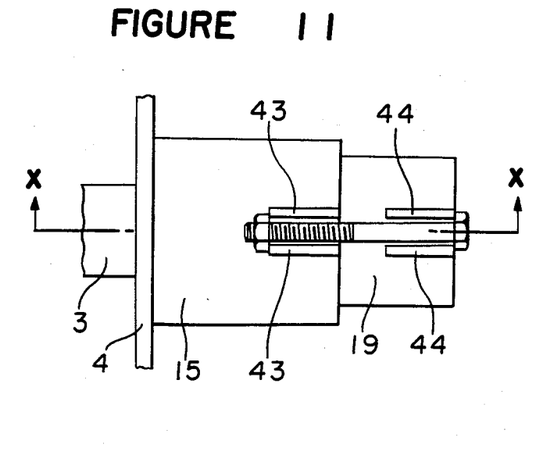
FIG. 11 is a front view of the essential part of another embodiment of the present invention.
Figure 12:
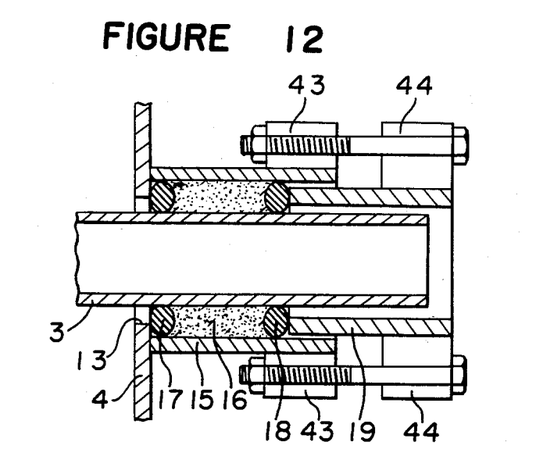
FIG. 12 is a cross sectional view taken along line X—X of FIG. 11.

FIGS. 11 and 12 show another embodiment of the present invention in which a flange fastening structure different from that in FIG. 3 is employed. In the flange fastening structure employed here, two pairs of axially parallel wings 43 are formed on the outer circumference of the ring member 15 in a diametrically opposed relation to each other. Likewise, corresponding two pairs of axially parallel wings 44 are formed on the outer circumference of the pressing ring 19. A bolt extends between the first pair of wings 43 and between the corresponding first pair of wings 44 and is associated with a nut to fasten the wings 43 and 44. Likewise, at the diametrically opposite side, another bolt extends between the second pair of wings 43 and between the corresponding second pair of wings 44 to fasten them.

The tube support plate 4 is lined with a refractory material 11 or a heat resistant inorganic fibrous blanket 30, as mentioned above. However, such lining is omitted in FIGS. 11 and 12.

With the flange fastening structure of this embodiment, the circumferencial spaces of the ring member 15 and the pressing ring 19 can be saved substantially as compared with the flange fastening structure of FIG. 3 wherein the flanges extend radially in all circumferential direction. Further, even when seizure occurs, the bolt can be relatively easily detached simply by displacing the bolt radially outwardly without taking a trouble of cutting off the bolt.

In the embodiment illustrated in FIGS. 11 and 12, two pairs of parallel wings are disposed in a diametrically opposite relation. However, more than two pairs of such wings may be provided at suitable positions, e.g. three pairs of such wings may be provided at equal intervals along the circumference i.e. with an angle of 120° to one another.

As shown in FIGS. 9, 10, 11 and 12 in the present invention, it is not essential to provide the rod 20 or the hollow tube 26, and accordingly it is not essential to provide elastic members 21, stands 27 and guide members 28.

By employing a screw fastening structure as shown in FIG. 2, it is possible to minimize the cross sectional surface area, normal to the axial direction of the tube, of the sealing structure of the present invention, and thus it is possible to obtain a compact sealing structure. On the other hand, by employing a flange fastening structure as in FIG. 3, it is possible to prevent the seizure of the screw portions or trapping of the sand at the screw portions, and even if the threaded portion of the bolt is burned, such a defect can readily be mended by cutting off the bolt. Instead of using a bolt and a nut, other suitable fastening means may be employed.

On the other hand, when the pressing ring is secured to the ring member by screw fastening as shown in FIG. 2, it may happen that it is difficult to control the fastening force or it becomes impossible to unscrew the pressing ring due to seizure at a high temperature. Further, when the pressing ring and the ring member are bolted by means of the flanges as shown in FIG. 3, it is normally necessary to take a wide space around the circumference of the ring member, and it becomes difficult to dispose a number of tubes closely to one another.

To avoid such difficulties, according to a preferred embodiment of the present invention, a pressing ring is inserted to compress and press the sand in said space, and the pressing ring is secured by a bayonet pin engagement of a pin with a groove. Thus, the pressing ring can readily be secured by the bayonet pin engagement, and even if seizure takes place, the pressing ring can readily be detached by exerting a light impact force. Further, the structure for securing the pressing ring can be made compact, and it is thereby possible to dispose a number of tubes closely to one another.

Figure 5:
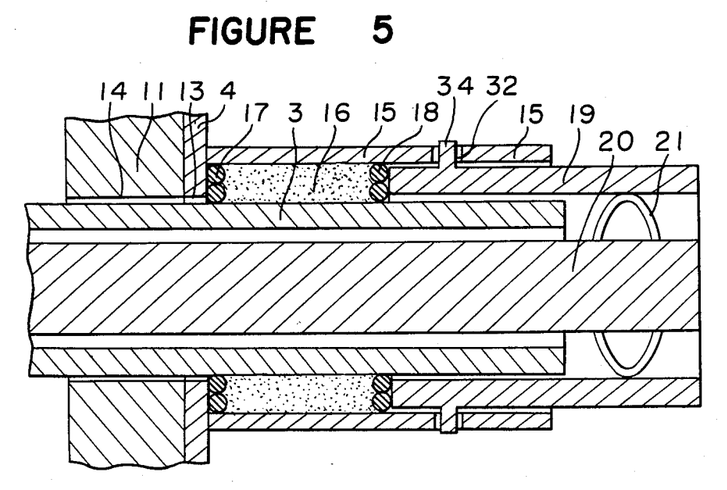
FIG. 5 is an enlarged cross sectional view of portion B of FIG. 4 illustrating another embodiment of the present invention.
Figure 6:
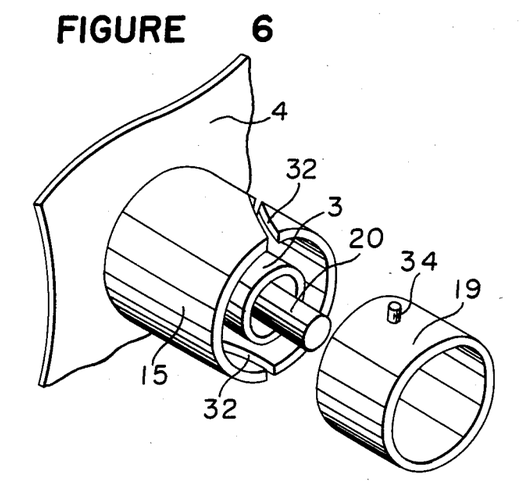
FIG. 6 is a perspective view of the essential part of the embodiment of FIG. 5.
Figure 7:
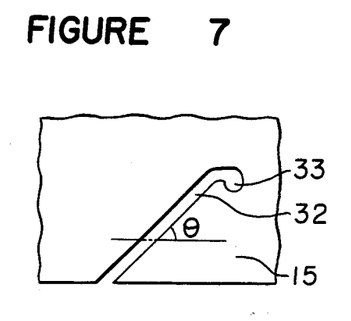
FIG. 7 is a development of the essential part of a ring member 15 showing a shape of the groove with which a bayonet pin in the embodiment of FIG. 5 engages.

The heat exchanger 40 shown in FIG. 4 is the same as the heat exchanger 1 shown in FIG. 1 except for the sealing structure between the tubes and the tube support plate. The same parts are identified by the same reference numerals. FIGS. 5 to 7 show the sealing structure between the tubes and the tube support plate in the heat exchanger 40. As illustrated, a ring member 15 having a pair of slit-like grooves 32 is secured to the tube support plate 4. As shown in FIG. 7, the grooves 32 are formed obliquely at an angle θ smaller than 90° relative to the open edge of the ring member 15, and anchoring portions 33 are formed at their forward ends. On the outer circumference of the pressing ring 19, a pair of bayonet pins 34 corresponding to the grooves 32 of the ring member 15 are formed.

In the above construction, when the pressing ring 19 is inserted between the ring member 15 and the heat exchanger tube 3 so that the bayonet pin 34 of the pressing ring 19 slides along the groove 32 of the ring member 15, the bayonet pin 34 engages the anchoring portion 33 of the groove 32, whereby the pressing ring 19 is fixed. In such a manner, the sand 16 is pressed by the pressing ring 19 via the rope member 18, whereby the sand 16 is compactly packed in the space between the heat exchanger tube 3 and the ring member 15, and the heating gas and the gas to be heated are thereby airtightly sealed from each other. Further, even when the bayonet pin 34 of the pressing ring 19 is burned on the groove 32 of the ring member 15 under a high temperature, the contact surface area between them is much smaller than the contact surface area in the case of the screw fastening structure, and accordingly the pressing ring 19 can easily be detached from the burned-on state by exerting a light impact force. Furthermore, the ring member 15 has no flanges protruding from the circumference and presents a compact configuration, whereby a plurality of heat exchanger tubes 3 may be arranged in close relation with one another.

Figure 8:
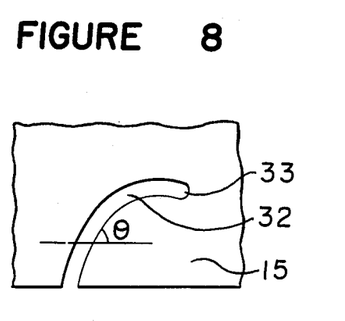
FIG. 8 is a development of the essential part of a ring member 15 showing another shape of the groove with which a bayonet pin engages.

If the shape of the groove 32 of the ring member 15 is modified as shown in FIG. 8 so that the angle θ decreases towards the forward end of the groove 32, the drag from the sand layer increases as the insertion of the pressing ring 19 progresses, but the force F cos θ to slide the bayonet pin 34 along the groove 32 advantageously increases even if the rotational force F exerted to the pressing ring 19 is maintained at a constant level. Thus, it is possible to advance the pressing ring while maintaining the rotational force applied to the pressing ring 19, i.e. the torque, at a constant level.

Figure 9:
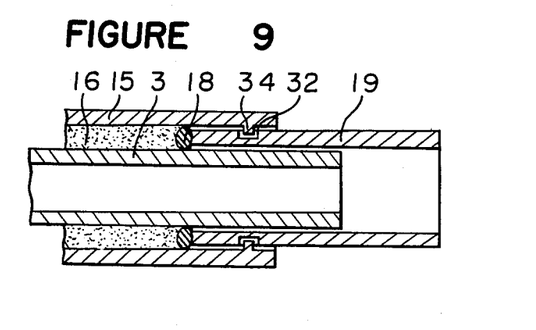
FIG. 9 is a cross sectional view of the essential part of a further embodiment of the present invention.

FIG. 9 illustrates another embodiment of the present invention. Namely, in this embodiment, recessed grooves 32 are formed along the outer circumference of the pressing ring 19, and a pair of bayonet pin 34 are protruded from the inner wall of the ring member 15. Thus, the pressing ring 19 can be fixed by inserting the pressing ring 19 between the heat exchanger tube 3 and the ring member 15 so that the bayonet pin 34 of the ring member 15 slides along the groove 32 of the pressing ring 19. According to this embodiment, the groove 32 is formed on the outer circumference of the pressing ring 19, and the processing for the formation of the groove is easy. Further, such an embodiment is advantageous in that the strength is high because the groove 32 is not a stamped out slit.

Figure 10:
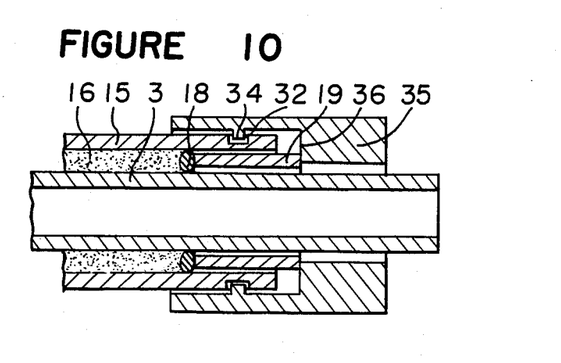
FIG. 10 is a cross sectional view of the essential part of a still further embodiment of the present invention.

FIG. 10 illustrates still another embodiment of the present invention. In this embodiment, a pressing member 35 is put on the outer circumference of the ring member 15, and a pressing ring 19 is inserted between the ring member 15 and the heat exchanger tube 3, whereby the pressing ring 19 may be pressed towards the sand layer side by the stepped portion 36 formed on the inner circumference of the pressing member 35. Grooves 32 are formed on the outer circumference of the ring member 15, and bayonet pins 34 are provided on the inner wall of the pressing member 35.

In each of the above embodiments, a pair of pins and grooves are provided. However, the combination may be modified to comprise one groove and one pin, or at least three grooves and the corresponding number of pins.

The present invention has been described with respect to the application to heat exchangers. However, the present invention is not restricted to such specific application, but may generally be applicable to e.g. a sealing structure between some tubes other than the heat exchanger tubes and a tube support plate, such as a dust removing apparatus using gas permeable porous tubes. Further, the material for the tubes such as the heat exchanger tubes 3 is preferably ceramics, but is not restricted to such a material, and may be e.g. a metal.

The sand leakage preventing means in the present invention is not restricted to the above-mentioned rope member 17 or 18, and there may advantageously be employed a mass of an inorganic fibrous material such as an inorganic fiber blanket, an inorganic fiber cloth, a laminate of inorganic fiber cloth, an inorganic fiber fabric, a metal net, a laminate of metal nets or a random mass of metal fibers or metal wires.

The tubes, ring members or pressing rings of the present invention are preferably cylindrical i.e. circular in cross section, e.g. for the convenience in the preparation and assembling. However, they may not necessarily be cylindrical and, for example, they may be tubes having a rectangular or hexagonal cross section, as the case requires.

Having thus described the present invention, it should be understood that according to the present invention, the tubes and the tube support plates are supported by means of a deformable and air-tight sand layer, and a compact and simple sealing structure is presented by using only the vicinity around the tubes. Further, the amount of the required sand is small. Accordingly, it is possible to preliminarily mold the sand in a predetermined ring-shape, and the preformed ring thereby obtained may readily be inserted between the ring member 15 and the heat exchanger tube 3. Thus, the packing of the sand can be simplified.

We claim:

1. A sealing structure between at least one tube and a tube support plate having a hole for each tube to extend therethrough, characterized in that a ring member enclosing each tube with a space therefrom is secured to the tube support plate, a sand is filled in the space to form a cylindrical sand layer surrounding the tube, and a means for preventing leakage of the sand is provided at each axial end of the sand layer.

2. The sealing structure according to claim 1, wherein the tube is made of ceramics.

3. The sealing structure according to claim 1, wherein the tube is a heat exchanger tube.

4. The sealing structure according to claim 1, wherein the tube is a gas permeable porous tube.

5. The sealing structure according to claim 1, wherein the means for preventing leakage of the sand is a mass of an inorganic fibrous material.

6. The sealing structure according to claim 1, wherein one of the means for preventing leakage of the sand rests against the tube support plate.

7. The sealing structure according to claim 1, wherein one of the means for preventing leakage of the sand rests against a stopper secured to the tube support plate.

8. The sealing structure according to claim 1, wherein one of the means for preventing leakage of the sand rests against a pressing ring inserted in said space.

9. The sealing structure according to claim 8, wherein the pressing ring is screwed on the ring member.

10. The sealing structure according to claim 8, wherein the pressing ring and the ring member have flanges, respectively, which are fastened to each other.

11. The sealing structure according to claim 8, wherein the pressing ring is secured by a bayonet pin engagement of a pin with a groove.

12. The sealing structure according to claim 11, wherein one of the pin and the groove is provided on the ring member, and the other is provided on the pressing ring.

13. The sealing structure according to claim 11, wherein one of the pin and the groove is provided on the ring member, and the other is provided on a pressing member against which the pressing ring rests.

* * * * *